Jan. 2, 1951     A. HANSEN, JR     2,536,806
HALL EFFECT CONTROL INITIATOR
Filed Aug. 4, 1948     2 Sheets-Sheet 1
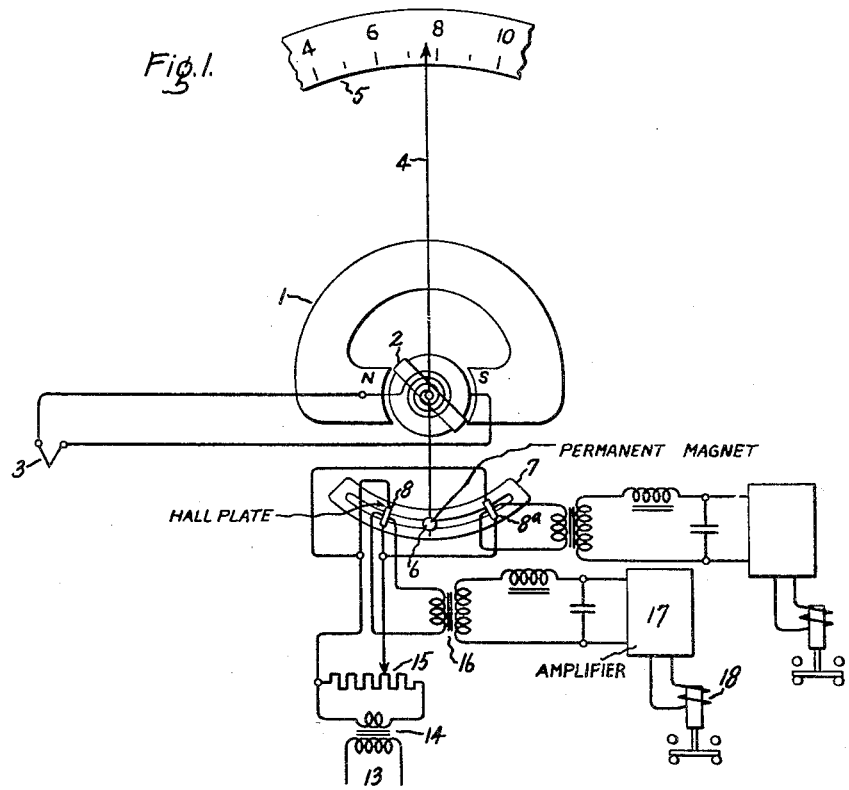
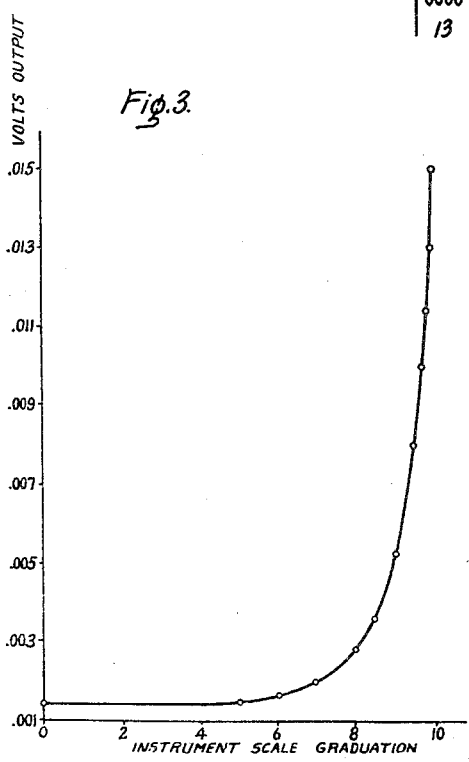
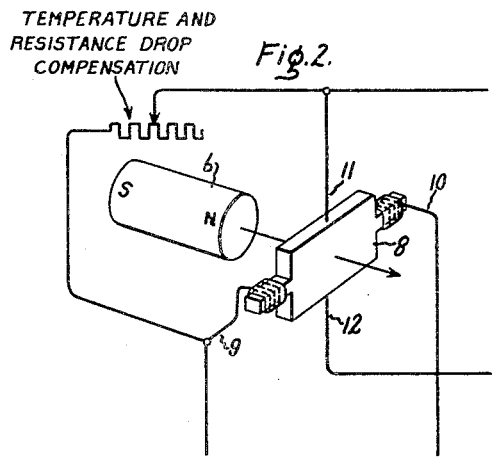
Inventor:
Albert Hansen Jr.,
by Prowell A. Mack
His Attorney.

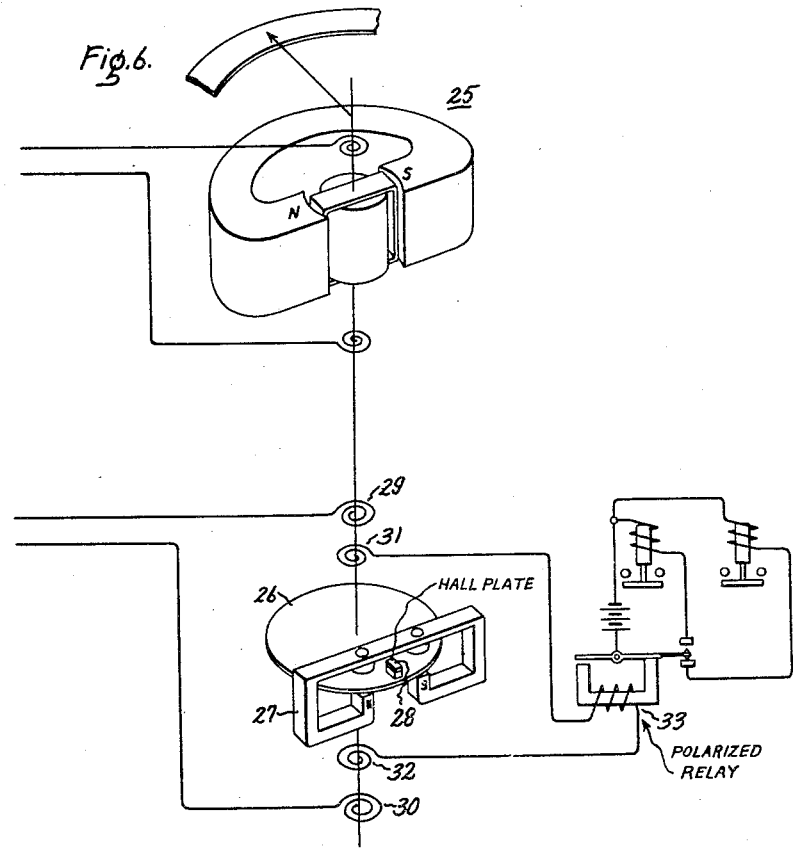
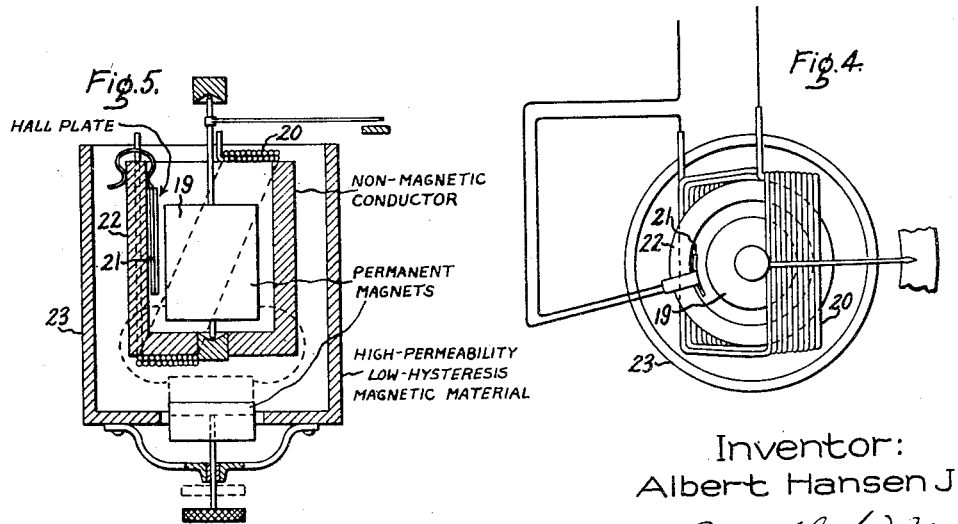

Patented Jan. 2, 1951

2,536,806

UNITED STATES PATENT OFFICE 2,536,806

HALL EFFECT CONTROL INITIATOR

Albert Hansen, Jr., Nahant, Mass., assignor to General Electric Company, a corporation of New York Application August 4, 1948, Serial No. 42,360

5 Claims. (Cl. 323—94)

My invention relates to an electric control initiator such as may be used to take the place of control contacts on a measuring instrument or relay device to initiate a control at a predetermined measurement, signal or impulse. My invention involves no mechanical contacting devices but utilizes the Hall effect and employs a tiny plate of material which exhibits the Hall effect, together with a source of current excitation therefor and a magnetic field producing means such as a permanent magnet. The Hall plate and magnet are relatively movable in response to a measuring device relay or the like with which my control device is associated, such that at some predetermined measurement value or signal the Hall plate is cut by the flux of the magnet sufficiently to produce a control voltage. The measurement value where this occurs is preferably adjustable. The features of my invention which are believed to be novel and patentable will be pointed out in the claims appended hereto.

The invention may take a variety of forms and some of these will be explained in connection with the accompanying drawing in which Fig. 1 represents a form in which a small permanent magnet is carried by the pointer of a measuring instrument past a stationary but adjustably positionable Hall plate. Fig. 2 shows an enlarged view of a Hall plate. Fig. 3 is a curve showing the output voltage produced by the Hall plate as the permanent magnet is moved toward the same. Figs. 4 and 5 show plan and sectional side views of a measuring instrument of the permanent moving magnet armature type in which the permanent magnet of the armature is also used as a part of the control initiator. Fig. 6 illustrates the Hall plate on a movable part of a measuring instrument where the field used therewith is a stationary damping magnet of the measuring instrument.

Referring now to Fig. 1, I represents the stationary field magnet and 2 the armature coil of a direct current measuring instrument represented as being energized from a thermocouple 3, such that the instrument will respond to the temperature to which the thermocouple is subjected. Moved with the armature is a pointer 4 indicating on a scale 5. At a point removed from the axis of rotation the pointer carries a tiny permanent magnet 6. The magnet 6 is shown as being attached to the pointer on the end opposite to the long end which indicates on scale 5. So far as my invention is concerned, the magnet may be placed near either end of the pointer or on any part of the moving system removed from the axis of rotation but when placed as shown, the counterweight necessary to balance the armature, including the magnet 6, is reduced to a minimum. As the pointer 4 swings over its scale 5, the magnet 6 swings over a circular track 7 on which a Hall plate 8 is adjustably mounted, such that at some selected point of adjustment the magnet 6 swings closely adjacent the Hall plate and produces an effective unidirectional field therethrough as represented by the arrow in Fig. 2.

As is well known, when a material which exhibits the Hall effect is excited by a current through one axis as along the axis of current terminals 9 and 10 in Fig. 2, and is cut by a flux field at right angles thereto as indicated by the arrow in Fig. 2, an output voltage is generated across a third axis at right angles to the current excitation and flux axes. Thus a voltage will appear across terminals 11 and 12 in Fig. 2, which voltage is proportional to the exciting current and to the field, and will be a direct current voltage if the excitation current and fields are unidirectional and will be an alternating voltage if the exciting current or the field is alternating. Some of the materials which exhibit this Hall effect to a varying degree are bismuth, tellurium and germanium. I have found germanium best suited for my purpose. I have found that a practicable control initiator of the character represented in Fig. 1 can be provided by using a germanium Hall plate 8, 0.174 inch thick, $\frac{1}{6}$ inch long and $\frac{3}{32}$ inch wide, with the extensions to which terminals 9 and 10 are attached extending $\frac{3}{32}$ inch. These proportions are approximately represented in Fig. 2. With such a plate I have used a magnet 6, $\frac{1}{6}$ inch long and $\frac{3}{32}$ inch in diameter, made of high-grade, lightweight, permanent magnet material and strongly polarized. Such a magnet may comprise 30% $Fe_2O_3$, 44% $Fe_3O_4$, 26% $Co_2O_3$ and weighs about 220 milligrams, and hence is suitable to be added to the armature assembly of a sensitive measuring instrument. It, together with its mounting, may add in the neighborhood of 10 per cent to the weight of the armature assembly.

In Fig. 1 the input current terminals 9 and 10 (Fig. 2) are shown excited from an alternating current source 13 through a step-down transformer 14 and an adjustable potentiometer resistance at 15. The output terminals 11—12 (Fig. 2) are connected through a step-up transformer 16, a filter circuit tuned to the input frequency, an amplifier 17 to a relay 18. With one-volt, 60-cycle excitation across terminals 9—10, the control initiator will reliably operate a seven-volt relay at 18, when the magnet 6 moves over the Hall plate 8.

The curve of Fig. 3 shows the relation of the output voltage of the Hall plate as fed to amplifier 17 as the magnet 6 is moved from zero to 10 on a 0–15, 90-degree scale 5, with the Hall plate 8 set to initiate a control such as the operation of relay 18 when the pointer 4 indicates at about 10 on the scale 5 and magnet 6 is directly over the plate 8. It is to be noted that the characteristics are such as to make possible very accurate setting of the control initiator. Thus the rise in voltage from 0.013 to 0.015, or about 15 per cent, represents a movement of the pointer of about one-fourth degree at the controlling point. There is no interference with the measurement movement of the instrument pointer with this control initiator. The Hall plate 8 may be moved to initiate control at any deflection point, and any reasonable number of Hall plates and control relays may be added to the same instrument for selective control at different measurement deflection points. At 8a in Fig. 1 there is represented a second Hall plate control initiator with associated relay system, the plate 8a being set to operate its relay at an instrument deflection at a lower point on scale 5. The additional Hall plates can be energized from the same source 13. The wires leading to a Hall plate will preferably be collected into a cable for convenience.

As indicated in Fig. 2, the lead-in wires 9 and 10 to the Hall plate are preferably wrapped about the terminal extensions to the plate and soldered. Likewise, the output terminals at 11 and 12 are well soldered to the Hall plate. There is a drop in voltage between the terminals 9 and 10 of the Hall plate due to the exciting current flowing through the resistance of such plate, and if the output terminals 11 and 12 are not exactly opposite each other along this resistance, there will be a proportional voltage drop across them when the field of magnet 6 is not present. With the small dimensions of the Hall plate employed, it is difficult to solder these output terminals 11 and 12 at exactly opposite points in relation to the resistance drop between the input terminals. Hence, it is generally desirable to provide an adjustable shunt balancing resistor between one of the output terminals and one of the input terminals, such as is shown between terminals 9 and 11 in Fig. 2, for the purpose of equalizing any voltage that might otherwise exist between the terminals 11 and 12, due to the resistance drop in the Hall plate between terminals 9 and 10. This shunt resistance may also have a temperature coefficient of resistance selected to compensate for any temperature error that may be exhibited by the Hall plate. For instance, if the output voltage of the Hall plate tends to decrease with rise in temperature, the shunt would have a positive temperature coefficient of resistance so as to shunt less current from the Hall plate upon a rise in temperature. This would tend to increase the current through the Hall plate and the output voltage for a given field flux.

Figs. 4 and 5 show plan and sectional side views of an electric measuring instrument of the type described in United States Letters Patent No. 2,102,409—December 14, 1937, having a permanent magnet armature member 19 and stationary energizing coil 20. My invention has been applied thereto, using the permanent magnet armature for the additional purpose of producing the field for my Hall plate control initiator. The Hall plate 21 is curved to better accommodate the space which it occupies between the cylindrical permanent magnet armature 19 and the cylindrical damping cup 22 of conductor material which supports the stationary energizing coil 20 of the instrument. The Hall plate 21 is made appreciably larger in area as compared to the dimensions previously mentioned in connection with Fig. 2, because the flux field is larger in area and not so concentrated as in Fig. 1. The flux of the armature is in a diametrical direction and rotates with the armature. A magnetic shield and flux return path are provided by the surrounding cup 23. The Hall plate is placed in the armature air gap at a point where the effective flux therethrough approaches a maximum as the control point is reached, and may be due in part to flux contributed by the energizing coil 20. The Hall plate 21 has input and output terminals as previously described and its position about the axis of rotation may be adjusted. Its input circuit may be energized by either direct or alternating current, and its output voltage may be amplified if necessary or desirable.

In some cases where conditions permit, it may be desirable to energize the Hall plate by a current or voltage or portion thereof which the instrument is measuring. Where this is possible, it eliminates the necessity of a separate source of supply and provides an even steeper voltage deflection curve than represented in Fig. 3 as the control point is approached in the upscale direction, because the Hall plate exciting current increases with increases in deflection when so energized. In Fig. 4, the Hall plate 21 is shown connected across in series in the energizing circuit of the instrument coil 20. The range of position adjustment for a Hall plate so excited is limited for operation over the upper range of instrument deflection, because at zero deflection there will be no input excitation for the Hall plate and no output voltage even though in an intense magnetic field. This expedient should be used only where it does not compromise the measurement accuracy or the proper excitation and functioning of the Hall plate control initiator.

It is, of course, possible to place the Hall plate on the moving system and the exciting field therefor on the stationary part of the measuring device. This involves lead-in spirals for at least the output voltage of the Hall plate but may be desirable for some applications. This is illustrated in Fig. 6. A direct current electric measuring instrument of the moving coil armature type is represented at 25. It is provided with a magnetic damper comprising a rotary conductor disk 26 on the instrument shaft which moves in an air gap of a permanent damping magnet 27 having closely adjacent poles of opposite polarity for producing corresponding fluxes across the air gap and through the disk 26. Mounted on and insulated from the disk 26 in a position to rotate through the flux gap is a Hall plate represented by 28. The Hall plate input current circuit is energized through spirals 29 and 30, and the output circuit comes out at spirals 31 and 32. The Hall plate output circuit is connected to the energizing coil of a sensitive polarized relay 33. When the Hall plate is rotated to intercept one of the damping flux fields, its output voltage will be of one polarity and operate the polarized relay in one direction. When the Hall plate intercepts the other damping flux field which is of opposite polarity, its output voltage will be reversed and operate the polarized relay in the opposite direction. At an intermediate position such as shown, the Hall plate will have no flux through it, and its output voltage will be zero. The Hall plate will be rotatively positioned on the disk 26 at the deflection range over which it is desired that this differential controlling action shall take place. Here use is made of the instrument damping magnet system 26—27 for the double purpose described.

While I have represented my control initiator as responsive to the movement of a measuring instrument, it may be made responsive to the movement of a wide variety of devices. It can, for example, be used in place of a manual control switch in places where the possibility of arcing contacts would be dangerous or where contact wear, noise sparking, radio interference, etc. are to be avoided.

What I claim as new and desire to secure by Letters Patent of the United States is:

1. A control device for use with moving element measuring instruments, comprising in combination with such an instrument having stationary and moving parts a Hall plate member and a permanent magnet member, one of which is stationary and the other of which is movable in close proximity but without contact therewith past the other, the movable member being mounted on the moving element of such measuring instrument, and the stationary member being mounted in relation to the stationary part of said instrument to be adjustable in position along the path of movement of the movable member so that the passing position of said members can be made to occur at different selected measurements, said Hall plate and permanent magnet being oriented to cause the permanent magnet flux to cut the Hall plate at right angles thereto when in such passing position, electric circuit connections for energizing said Hall plate with an operating input current, and output terminals on said Hall plate across which an effective output operating voltage occurs when said members are adjacent each other due to the Hall effect of such device.

2. A control device for use with measuring instruments, comprising in combination with a moving element electric measuring instrument, a Hall plate and a permanent magnet which may be a part of such instrument, the Hall plate and permanent magnet being relatively movable by reason of one of them being mounted on the moving element of such instrument and the other being stationary, such stationary part being positioned adjacent to and along the path of movement of said other part such that as the moving element approaches a selected measurement position flux from the permanent magnet passes through the Hall plate at right angles to its plane in a progressively increasing amount and reaches a maximum at such selected measurement position, an electric circuit from which said instrument is energized for measurement purposes, connections from said Hall plate to said circuit for energizing said Hall plate with an input current such that a Hall effect voltage is produced thereby in proportion to the current and flux through the Hall plate, and a control circuit responsive to the Hall effect voltage variations to and from maximum value.

3. A control device for use on electric measuring instruments, comprising in combination with an electric measuring instrument having a moving permanent magnet armature, a Hall plate secured to the stationary part of such instrument in a position to be cut by the flux of such permanent magnet in a varying amount as the latter moves over its measurment range, an electric circuit connected to said Hall plate for producing an input energizing current therethrough, such that a Hall effect voltage is produced by said plate which is proportional to such energizing current and the measurement position of said armature, and a control circuit connected to be responsive to the Hall effect voltage produced by said plate.

4. In a control device, a Hall plate which has a thin generally rectangular oblong shape, a magnet positioned to produce a flux through said plate at right angles to the plane of the plate, current input terminals at opposite ends of said plate, output terminals at opposite edges of said plate approximately midway between its ends, and a resistance circuit connected between one input terminal and one output terminal for compensating for any resistance drop that may exist between the output terminals due to current flow in the plate between the input terminals, said resistance circuit having a temperature coefficient of resistance proportioned to minimize temperature errors in the operation of said control device.

5. A control device comprising a generally oblong rectangular thin Hall plate and a permanent magnet, said plate and magnet being relatively movable from a position where the plate intersects a substantial portion of the flux of the magnet at right angles to the plane of such plate to a position where such flux intersection is negligible, current input terminals at the ends of such Hall plate, output terminals at approximately the center edges of said Hall plate and a resistance circuit between one of the input and one of the output terminals of said Hall plate for compensating for any resistance drop in the Hall plate between said output terminals that may exist due to current flow through the plate between said input terminals.

ALBERT HANSEN, Jr.

REFERENCES CITED

The following references are of record in the file of this patent:

UNITED STATES PATENTS

| Number | Name | Date |
|---|---|---|
| 1,825,855 | Craig | Oct. 6, 1931 |
| 1,998,952 | Edgar | Apr. 23, 1935 |
| 2,045,769 | Geffcken | June 30, 1936 |
| 2,150,440 | Hargreaves | Mar. 14, 1939 |
| 2,365,430 | Naul | Dec. 19, 1944 |
| 2,403,889 | Di Toro | July 9, 1946 |
| 2,443,073 | Knudson | June 8, 1948 |
| 2,448,502 | Wilson | Aug. 31, 1948 |
| 2,449,538 | Ackerman | Sept. 21, 1948 |
| 2,456,062 | Iwanski | Dec. 19, 1948 |

OTHER REFERENCES

"Magnetism and Electricity" by Brooks and Rayser, new impression, 1927, published by Longmans, Green and Co. Ltd., London, England, pages 498 and 499.

"Review of Scientific Instruments," volume 19, No. 4, April 1948, pages 263, 264, 265.

"Handbook of Chemistry and Physics," 19th edition, September 1934, published by Chemical Rubber Publishing Co., Cleveland, Ohio, page 1374.